(12) United States Patent
Komatsu et al.

(10) Patent No.: US 6,801,406 B2
(45) Date of Patent: Oct. 5, 2004

(54) FLEXIBLE DISK DRIVE HAVING A PARTICULAR ARRANGEMENT FOR MOUNTING A METAL FITTING FOR A GUIDE BAR TO A MAIN FRAME

(75) Inventors: Hisateru Komatsu, Tendo (JP); Makoto Takahashi, Obanazawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 198 days.

(21) Appl. No.: 10/245,747

(22) Filed: Sep. 17, 2002

(65) Prior Publication Data

US 2003/0053247 A1 Mar. 20, 2003

(30) Foreign Application Priority Data

Sep. 17, 2001 (JP) .................................... 2001-280897

(51) Int. Cl.⁷ ................................................ G11B 5/55
(52) U.S. Cl. .................................................. 360/267.6
(58) Field of Search ...................... 360/99.01, 266.6, 360/266.5, 267.6, 267.5

(56) References Cited

U.S. PATENT DOCUMENTS

| | | | | |
|---|---|---|---|---|
| 4,528,607 A | * | 7/1985 | Thompson | 360/267.4 |
| 4,783,708 A | * | 11/1988 | Hasegawa | 360/267.6 |
| 4,875,120 A | * | 10/1989 | Takahashi et al. | 360/267.7 |
| 5,440,438 A | * | 8/1995 | Saito | 360/267.6 |
| 5,648,883 A | * | 7/1997 | Sampei et al. | 360/267.5 |
| 5,912,789 A | * | 6/1999 | Konno et al. | 360/267.6 |
| 6,137,651 A | * | 10/2000 | Clayton et al. | 360/266.6 |
| 6,282,065 B1 | * | 8/2001 | Inoue et al. | 360/267.3 |
| 6,356,415 B1 | * | 3/2002 | Kabasawa | 360/256.3 |

FOREIGN PATENT DOCUMENTS

| | | | | |
|---|---|---|---|---|
| JP | 8-129838 A | * | 5/1996 | |
| JP | 2001-216704 A | | 8/2001 | |

* cited by examiner

*Primary Examiner*—Jefferson Evans
(74) *Attorney, Agent, or Firm*—Frishauf, Holtz, Goodman & Chick, P.C.

(57) ABSTRACT

A flexible disk drive comprises a magnetic head, a head carriage, and a guide rod, attached by a metal fitting on a main frame of the flexible disk drive, guiding the head carriage in the tracking direction. The metal fitting has a longitudinal member which has first and second ends and is provided with a protruding/caved portion and a hole portion at opposite ends, respectively. The protruding/caved portion is formed on the first end of the metal fitting and engaged with a caved/protruding portion formed on the main frame. The hole portion is formed on the second end of the metal fitting and a male screw is screwed into a female screw formed on the main frame through the hole portion.

3 Claims, 4 Drawing Sheets

FLEXIBLE DISK DRIVE HAVING A PARTICULAR ARRANGEMENT FOR MOUNTING A METAL FITTING FOR A GUIDE BAR TO A MAIN FRAME

BACKGROUND OF THE INVENTION

The present invention relates to a flexible disk drive used for driving a flexible disk which is used to record/reproduce information or data, in particular, to a flexible disk drive provided with a guide rod for guiding a magnetic head assembly (head carriage) in a tracking direction.

As well known in the art, the flexible disk drive (FDD) of the type is an apparatus which performs to record/reproduce information or data to/from a magnetic recording medium having a disk-shape contained in the flexible disk (FD) inserted into the flexible disk drive. Such as the flexible disk drive can be installed in an electric apparatus such as a personal computer.

For example, an existing flexible disk drive of the type is disclosed in unexamined Japanese Patent Publication No. 2001-216704 (JP2001-216704A). The existing flexible disk drive comprises a magnetic head for reading/writing data from/to the magnetic recording medium of the flexible disk, a head carriage disposed movably along a predetermined radial direction to the flexible disk (tracking direction) loaded in the FDD and supporting the magnetic head at a tip thereof, a stepping motor for moving the head carriage along the tracking direction, and a spindle motor for rotatably driving the magnetic recording medium with the flexible disk loaded in the FDD. The spindle motor is structured by a direct-drive (DD) motor.

The head carriage is guided in the tracking direction by a rod-shaped member so called a guide rod. The guide rod is rigidly attached to a main frame of the flexible disk drive by a metal fitting. For example, the metal fitting is made of metal having elasticity such as stainless steel (such as SUS304) and has a length corresponding to the guide rod. Namely, the metal fitting is arranged so as to hold the guide rod onto the main frame. The guide rod extends through through-holes in and slidably held by the head carriage. Furthermore, opposite end portions of the metal fitting are rigidly attached to the main frame by screws, respectively. In other words, the metal fitting is fixedly mounted on the main frame by the use of two screws.

With the miniaturization (that is especially the thickness reduction), the weight reduction, and the manufacturing cost reduction of the electric apparatus mentioned above, the flexible disk drive to be installed in the electric apparatus is also required to fulfil the miniaturization described above. In order to satisfy the requirement, the reduction of the part number of the flexible disk drive is also effective.

SUMMARY OF THE INVENTION

It is therefore an object of the present invention to provide a flexible disk drive having parts reduced in number, and therefore being produced with a reduced thickness.

The other objects, features, and advantages of the present invention will become clear as the following description proceeds.

According to an aspect of the present invention, there is provided a flexible disk drive for driving a flexible disk used to record/reproduce data, the flexible disk drive comprising a main frame, a magnetic head for recording/reproducing data to/from the flexible disk, a head carriage movably mounted on the mainframe and supporting the magnetic head for carrying the magnetic head in a tracking direction, and a guide rod attached by a metal fitting on the main frame of the flexible disk drive for guiding the head carriage in the tracking direction. The metal fitting has a longitudinal member and having first and second ends. The first and the second ends are provided with a protruding/caved portion and a hole portion, respectively. The protruding/caved portion of the fitting metal is formed on the first end of the metal fitting and engaged with a caved/protruding portion formed on the main frame. The hole portion of the fitting metal is formed on the second end of the metal fitting. A male screw is screwed into a female screw formed on the main frame through the hole portion.

DESCRIPTION OF THE PREFERRED EMBODIMENT

Figure 1:
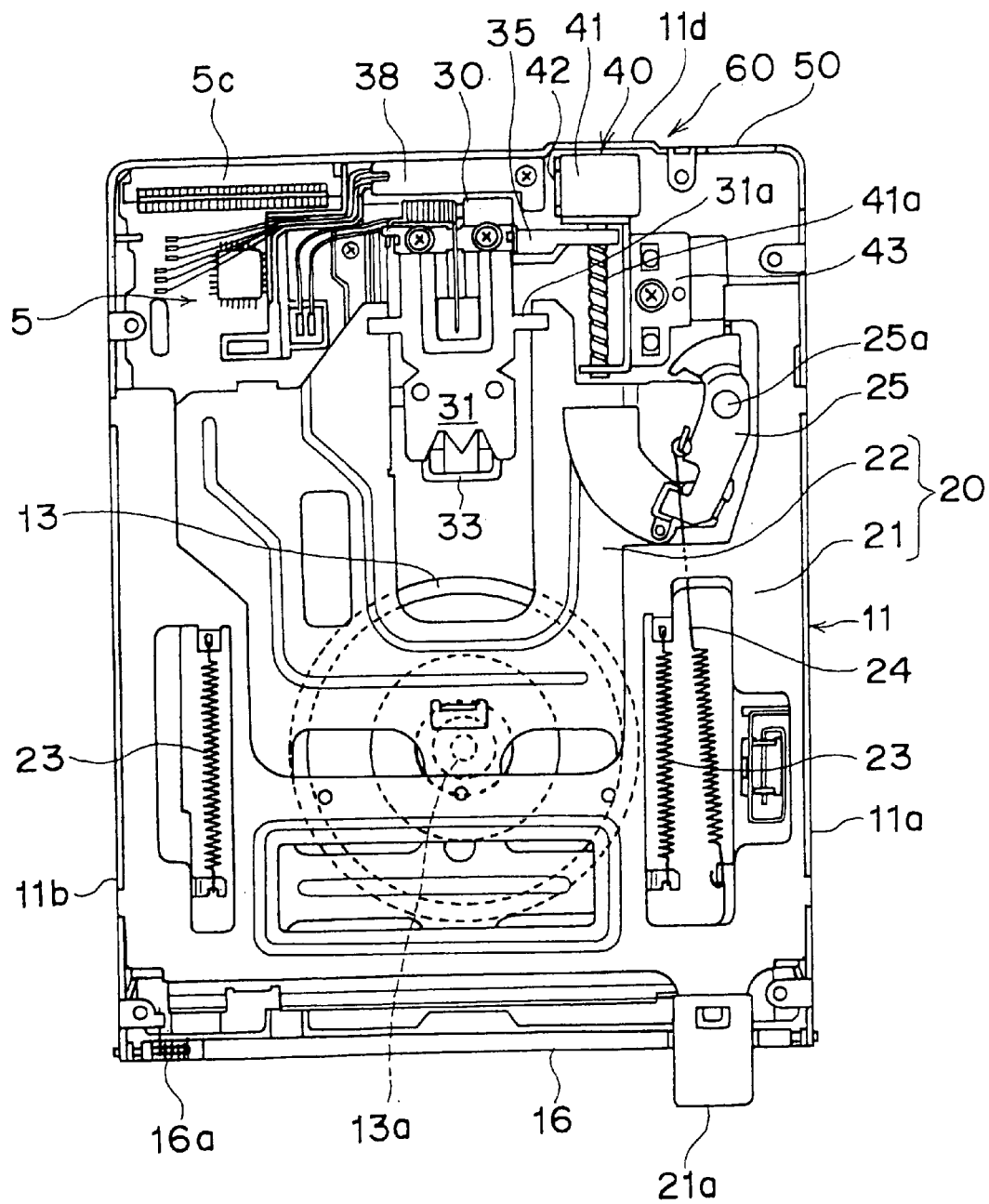
FIG. 1 is a top plan view showing a flexible disk drive according to an embodiment of the present invention, with a top cover being removed.

Now, a preferred embodiment of the present invention will be described with reference to FIGS. 1 to 4 of the drawing.

Referring to FIGS. 1 to 4, an FDD 60 is provided with a main frame 11, a disk loading and discharging mechanism 20, a front bezel 16, a head carriage 30, and a screw type stepping motor 40. The main frame 11 has a box shape with a top side and a front side thereof opened. The front bezel 16 is movably attached to the front side of the main frame 11 so as to open and close the front side.

The disk loading and discharging mechanism 20 comprises an eject plate 21 and a disk holder 22 disposed under or inside of the eject plate 21. A cartridge containing a flexible magnetic disk is contained in a space between the disk holder 22 and the base plate 11a of the main frame 11 and above a turntable 13. The eject plate 21 is urged in a front direction, which will be shown in a lower direction in the drawing, relative to the disk holder 22 by coil springs 23 provided on both sides of the eject plate 21. Furthermore, at one end of the disk holder 22, there is provided an eject lever 25 rotatable about a shaft 25a. A coil spring 24 is provided between the eject lever 25 and the disk holder 22.

When the cartridge of the flexible magnetic disk is loaded, one end portion of the disk cartridge is brought into contact with one end of the eject lever 25 and the eject lever 25 is rotated in the clockwise direction about the shaft 25a. When the eject lever 25 is rotated up to a predetermined position, the eject lever 25 is stopped by engaging with the disk holder 22.

On the other hand, for ejecting the disk cartridge, an eject button 24 is depressed, for example, an upward direction in the drawing, and the engagement between the eject lever 25 and the disk holder 22 is disengaged, and by recovering force of the coil spring 24, the eject lever 25 is rotated in the counterclockwise direction to thereby push out the disk cartridge.

Figure 2:
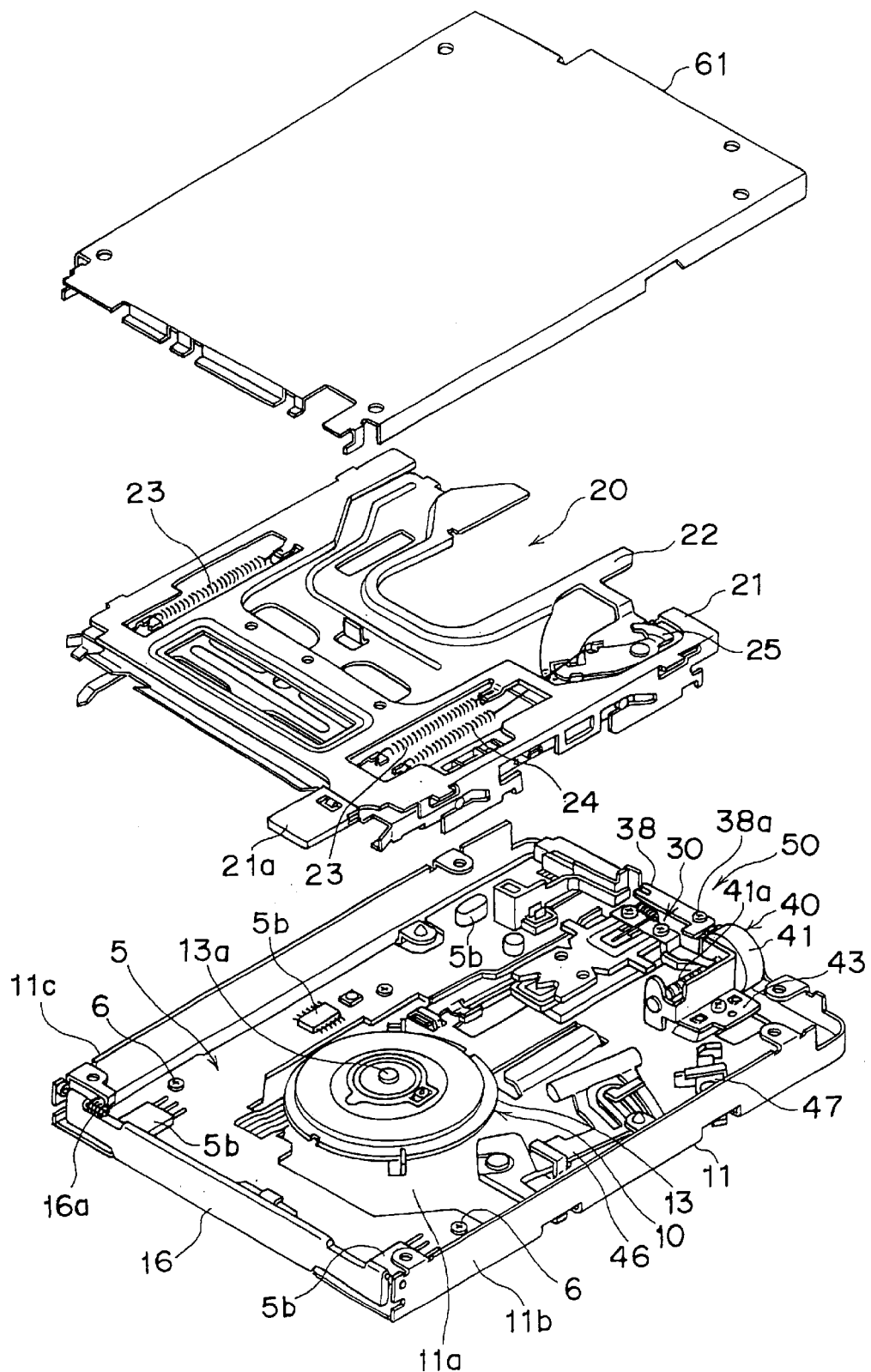
FIG. 2 is a perspective view showing the flexible disk drive disassembled.

As clearly shown in FIG. 2, the FDD 60 comprises an essential portion 50, the disk loading and discharging mechanism 20 contained in the essential portion 50, and a cover 61 for covering an upper portion thereof.

Figure 3:
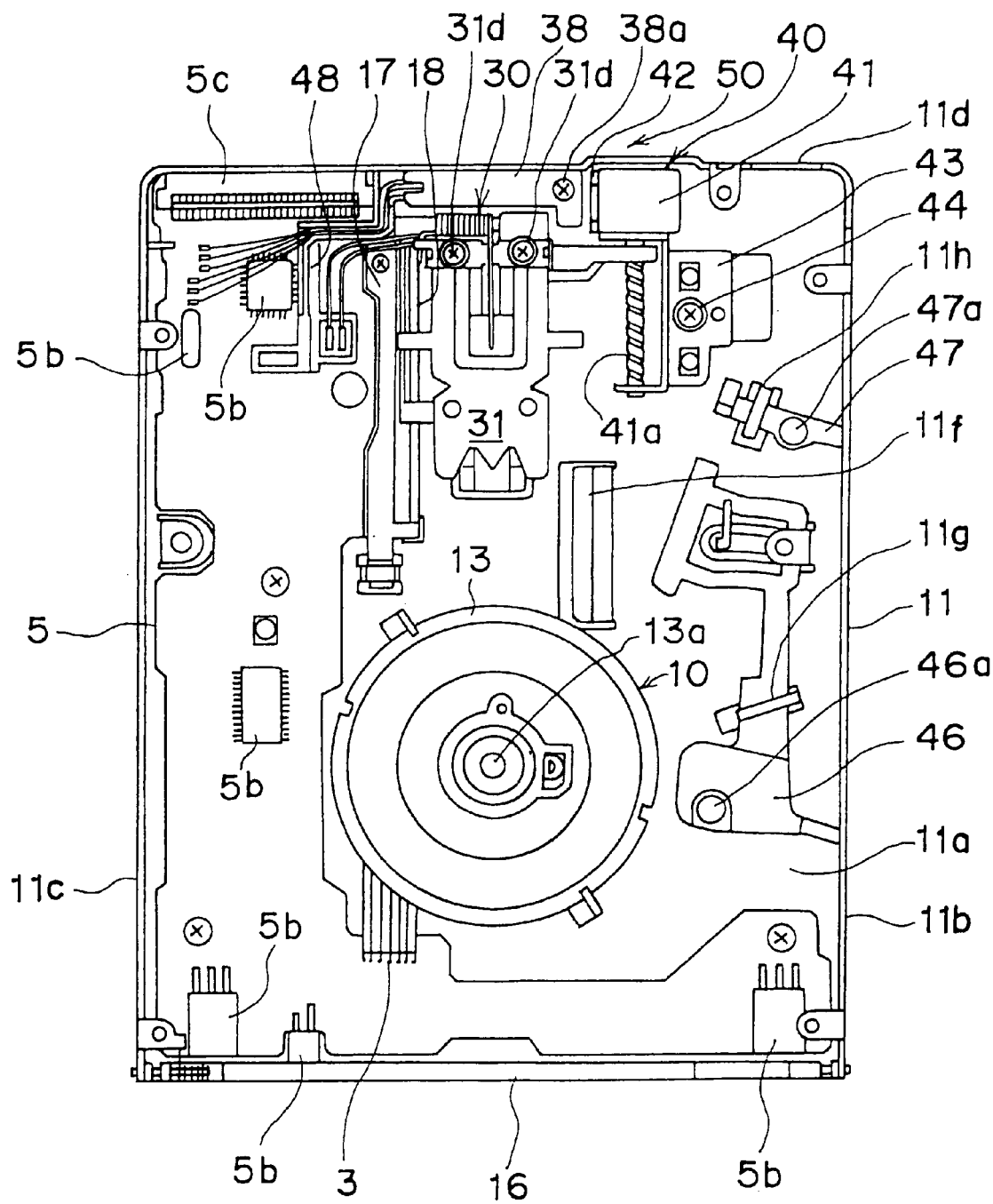
FIG. 3 is a top plan view showing the principal part of the flexible disk drive, with an eject plate and a disk holder being removed.
Figure 4:
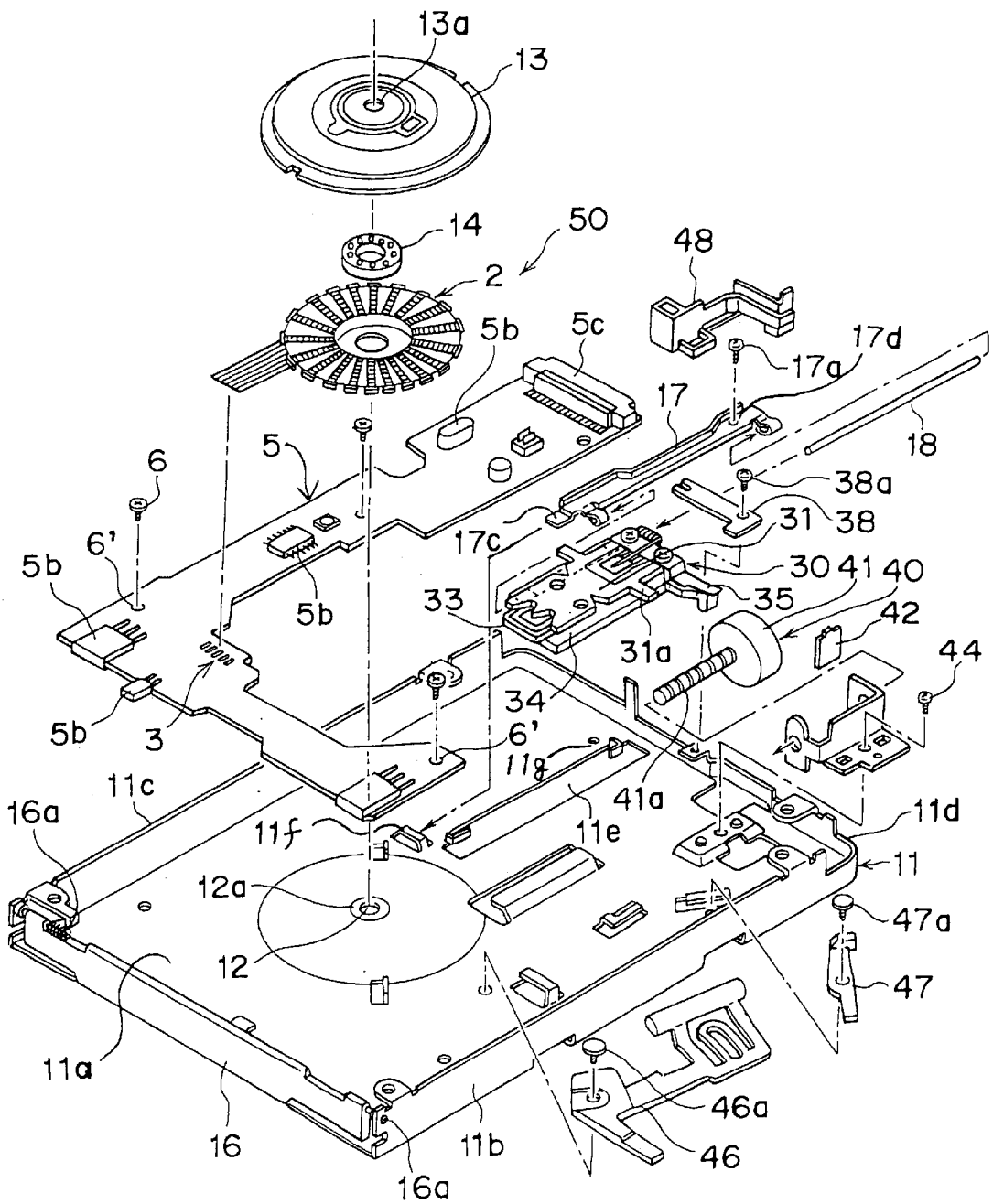
FIG. 4 is a perspective view showing the principal part of the flexible disk drive disassembled.

As clearly shown in FIGS. 3 and 4, the principal portion 50 of the FDD 60 is provided with the main frame 11, a spindle motor 10 mounted on the base plate 11a of the main frame 11, and the main board 5 disposed on the base plate 11a at a surrounding of the spindle motor 10.

The head carriage 30 is provided at a rear portion of the base plate 11a of the main frame 11. One side of the head carriage 30 is provided with a guide rail 18 inserted therein. Furthermore, other side of the head carriage 30 is engaged with a helical or screw groove portion of a drive rod 41 a extended from a main body 41 of a stepping motor 40. A rear side of the head carriage 30 is fixed with a board 38 for electric connection by a screw 38a. The spindle motor 10 is mounted on the base plate 11a adjacent one side portion of the head carriage 30. The spindle motor 10 is fixed to its position on the base plate 11a by fastening a metal piece 13 by a screw 13a. Furthermore, a circuit board (not shown) for supplying current is provided adjacent one side of the spindle motor 10.

The metal fitting 17 holds the guide rod 18 along which the head carriage 30 is slidable on the base plate 11a of the main frame 11. In more detail, a tip of a first end 17c of the metal fitting 17, closely to which the guide rod 18 is previously engaged with the metal fitting 17 is inserted in a hollow arch 11f formed on the base plate 11a. Furthermore, a male screw 17a is screwed through a hole in a second end 17d of the metal fitting 17 in a female screw 11g formed on the base plate 11a, so that the metal fitting 17 and the guide rod 18 are fixed and rigidly mounted on the base plate 11a. The metal fitting 17 is, like the existing flexible drive, made of metal having elasticity such as stainless steel (such as SUS304). The guide rod 18 is fixed in the tracking direction by two protrusions formed on the base plate 11a.

When the male screw 17a is a tapping screw, the female screw 17 is provided by preparing a plane hole portion having a smaller diameter than the diameter of the male screw 17a and screwing and tapping the male screw 17a into the plane hole portion.

Meanwhile, a slot portion may be formed on the base plate 11a instead of the hollow arch 11f and the tip of the first end 17c of the metal fitting 17 may be bent downwardly. In this structure, the bent tip of the metal fitting 17 is inserted in the slot portion of the base plate 11a.

Furthermore, a standing portion may be formed on the base plate 11a instead of the hollow arch 11f and a hollow arch may be formed on the tip of the first end 17c of the metal fitting 17.

Furthermore, an upper face of the base plate 11a is provided with a push up lever 46 for pushing up the disk cartridge in cooperation with the eject plate 22 (in FIG. 2), an eject lever 25a and a lock releasing lever 47 for disengaging engagement with the disk holder 21.

Referring to FIG. 4, in order to assemble the essential portion 50, the main board 5 is fixed to the base plate 11a of the main frame 11 by a screw 6.

Next, the flexible board 2 formed with the solenoid coil is mounted to a bottom portion of the base plate 11a of the main frame 11 by aligning to a through hole 12 having a bearing 12a. The bearing 14 is mounted on the center of the flexible board 2, and a rotating shaft 145 of the turntable 13 is rotatably received in the through hole 12 via the bearing 12a. Here, the turntable 13 is disposed so that a cut-up portion provided at the base plate 11a is fit in a groove of the turntable 13. Once the turntable 13 is mounted, the turntable 13 is rotatable, but the turntable 13 cannot be removed so far as rotational positions of the groove and the cut-up portion do not coincide with each other.

The head carriage 30 has a C-shape in a vertical section thereof and magnetic head elements 33 are mounted on inner sides of upper and lower head support pieces 31 and 33, respectively. Adjacent to one side of the head carriage 30, this is disposed the stepping motor 40 having a drive rod 41a projecting from one end thereof. The stepping motor 40 is fixed by fixing a metal piece 13 to a projected portion 44 formed on the base plate by a screw 48 such that an engaging portion 35 at one end of the head carriage 30 is engaged with a screw groove formed on the drive rod 41a of the stepping motor 40.

Furthermore, a member 48 in an S-like shape is made of plastic and is provided for guiding a cable for connecting the head carriage 30 with the main board 5 and reinforcing FDD.

Furthermore, the push up lever 46 for pushing up the loaded flexible disk cartridge in an outer and front direction in cooperation of the eject plate 21 (FIG. 2) in ejecting the disk cartridge, and the lock releasing lever 47 for lifting the disk holder 22 and disengaging engagement of the eject plate 21 and the disk holder 22 in the front and rear direction are rotatably mounted by pins 46a and 46b, respectively. As shown in FIG. 4, when the essential portion 50 is assembled, the essential portion 50 is completed as shown in the plan view of FIG. 3.

Furthermore, when the disk loading and discharging mechanism 20 is mounted onto the essential portion 50 as shown in FIG. 2, the structure is completed. Furthermore, by mounting the cover 61 as shown in FIG. 2, assembling of the disk drive is finished.

While the present invention has thus far been described in conjunction with the embodiment thereof, it will readily be possible for those skilled in the art to put the present invention into practice in various other manners.

What is claimed is:

1. A flexible disk drive for driving a flexible disk used to record/reproduce data, said flexible disk drive comprising:

a main frame;

a magnetic head for recording/reproducing data to/from the flexible disk;

a head carriage movably mounted on said mainframe and supporting said magnetic head for carrying said magnetic head in a tracking direction; and a guide rod attached by a metal fitting on said main frame of said flexible disk drive for guiding said head carriage in said tracking direction;

said metal fitting having a longitudinal member and having first and second ends, said first and said second ends being provided with a protruding/caved portion and a hole portion, respectively;

said protruding/caved portion of said fitting metal being formed on said first end of said metal fitting and engaged with a caved/protruding portion formed on said main frame;

said hole portion of said fitting metal being formed on said second end of said metal fitting, and a male screw being screwed into a female screw formed on said main frame through said hole portion.

2. The flexible disk drive according to claim 1, wherein said caved/protruding portion of said main frame is structured by a slot portion formed on said main frame, said protruding/caved portion being structured by a tip of said first end.

3. The flexible disk drive according to claim 1, wherein said caved/protruding portion of said main frame is structured by a hollow arch formed on said main frame, said protruding/caved portion being structured by a tip of said first end.

* * * * *